United States Patent
Cao (10) Patent No.: US 10,168,573 B2
(45) Date of Patent: Jan. 1, 2019

(54) BACKLIGHT ASSEMBLY AND DISPLAY APPARATUS

(71) Applicant: BOE TECHNOLOGY GROUP CO., LTD., Beijing (CN)

(72) Inventor: Lei Cao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/030,595

(22) PCT Filed: Dec. 28, 2015

(86) PCT No.: PCT/CN2015/099132
§ 371 (c)(1),
(2) Date: Apr. 20, 2016

(87) PCT Pub. No.: WO2016/184112
PCT Pub. Date: Nov. 24, 2016

(65) Prior Publication Data
US 2016/0342027 A1    Nov. 24, 2016

(30) Foreign Application Priority Data
May 21, 2015 (CN) .......................... 2015 1 0263202

(51) Int. Cl.
*G02F 1/1335* (2006.01)
*G02F 1/1333* (2006.01)

(52) U.S. Cl.
CPC .. *G02F 1/133608* (2013.01); *G02F 1/133308* (2013.01); *G02F 2001/133314* (2013.01)

(58) Field of Classification Search
CPC ......... G02F 1/133308; G02F 1/133608; G02F 2001/133314
See application file for complete search history.

(56) References Cited

U.S. PATENT DOCUMENTS

| 2009/0168405 A1 | 7/2009 | Yoo et al. |
| 2012/0050635 A1* | 3/2012 | Yoo .................. G02F 1/133308 349/58 |

(Continued)

FOREIGN PATENT DOCUMENTS

| CN | 102200236 A | 9/2011 |
| CN | 204141412 U | 2/2015 |

(Continued)

OTHER PUBLICATIONS

International Search Report & Written Opinion dated Feb. 23, 2016 regarding PCT/CN2015/099132.

(Continued)

*Primary Examiner* — Nimeshkumar Patel
*Assistant Examiner* — Jacob R Stern
(74) *Attorney, Agent, or Firm* — Intellectual Valley Law, P.C.

(57) ABSTRACT

The present application discloses a backlight assembly, comprising an optical film; and a frame for retaining the backlight and the optical film. The frame comprises a side wall having a first end surface, a second end surface opposite to the first end surface, a first side surface and a second side surface opposite to the first side surface; and a first receiving protrusion for receiving the backlight; and a second receiving protrusion for receiving the optical film, the first receiving protrusion and the second receiving protrusion protruding from the first side surface of the side wall in a first direction.

19 Claims, 7 Drawing Sheets

(56) References Cited

U.S. PATENT DOCUMENTS

| | | | | |
|---|---|---|---|---|
| 2012/0162569 A1* | 6/2012 | Sekiguchi | ......... | G02F 1/133308 349/58 |
| 2012/0242926 A1* | 9/2012 | Hsu | ................... | G02F 1/133308 349/58 |
| 2016/0213173 A1* | 7/2016 | Xu | ....................... | A47G 1/0622 |

FOREIGN PATENT DOCUMENTS

| CN | 204348262 U | 5/2015 |
|---|---|---|
| CN | 104808379 A | 7/2015 |

OTHER PUBLICATIONS

Second Office Action in the Chinese Patent Application No. 201510263202.X, dated Dec. 4, 2017; English translation attached.

* cited by examiner

BACKLIGHT ASSEMBLY AND DISPLAY APPARATUS

CROSS-REFERENCE TO RELATED APPLICATION

This application is a national stage application under 35 U.S.C. § 371 of International Application No. PCT/CN2015/099132 filed Dec. 28, 2015, which claims priority to Chinese Patent Application No. 201510263202.X, filed May 21, 2015, the contents of which are incorporated by reference in the entirety.

TECHNICAL FIELD

The present invention relates to display technology, more particularly, to a backlight assembly and a display apparatus.

BACKGROUND

The liquid crystal module to a large degree determines the brightness, contrast, color, and view angle of a liquid crystal display device. The liquid crystal module is the key component of a liquid crystal display device, including a backlight assembly and a liquid crystal display panel. The backlight assembly includes a light source for providing light to the liquid crystal display panel during image display.

SUMMARY

In one aspect, the present invention provides a backlight assembly comprising a backlight; an optical film; and a frame for retaining the backlight and the optical film. The frame comprises a side wall having a first end surface, a second end surface opposite to the first end surface, a first side surface and a second side surface opposite to the first side surface; and a first receiving protrusion for receiving the backlight; and a second receiving protrusion for receiving the optical film, the first receiving protrusion and the second receiving protrusion protruding from the first side surface of the side wall in a first direction.

Optionally, a peripheral portion of the optical film is on a side of the second receiving protrusion distal to the first receiving protrusion.

Optionally, the backlight comprises a light source and a backplane, an end of the backplane adjoining an end of the first receiving protrusion, the back plane and the first receiving protrusion substantially on a same plane.

Optionally, the backlight comprises a light source and a light guide, a peripheral portion of the light guide on a side of the first receiving protrusion proximal to the second receiving protrusion.

Optionally, the frame comprises a combining protrusion on the first end surface.

Optionally, the combining protrusion extending in a second direction substantially perpendicular to the first end surface.

Optionally, the combining protrusion has a substantially wedge shape.

Optionally, the first direction is substantially parallel to the first end surface and the second end surface.

In another aspect, the present invention provides a display apparatus comprising the backlight assembly described herein, an elastic pad on a side of the first end surface distal to the second end surface; and a display panel on a side of the elastic pad distal to the first end surface.

Optionally, the optical film is on a side of the elastic pad proximal to the first end surface, the optical film and the display panel are substantially parallel to each other.

Optionally, the elastic pad comprises a combining recess, the combining recess being fitted with the combining protrusion.

Optionally, the elastic pad is an elastic frame having a substantially rectangular shape.

Optionally, the display apparatus comprises a plurality of the elastic pads.

Optionally, the display apparatus comprises four elastic pads around four corners of the frame.

Optionally, the display apparatus comprises eight elastic pads.

Optionally, the display apparatus further comprises a baffle on a side of the first end surface distal to the second end surface, protruding in a third direction substantially parallel to the first end surface, a peripheral portion of the optical film is sandwiched by the baffle and the second receiving protrusion.

Optionally, the elastic pad is thicker than the baffle.

Optionally, the elastic pad is an elastic frame having a substantially rectangular shape, the elastic frame comprises a plurality of recesses for receiving a plurality of the baffles, the plurality of recesses being fitted with the plurality of the baffles.

Optionally, the display apparatus comprises a plurality of the elastic pads, the baffle is between two neighboring elastic pads.

Optionally, the baffle has a substantially L shape comprising a first arm and a second arm, the first arm on a side of the first end surface distal to the second end surface, the second arm on a side of the second side surface distal to the first side surface.

Optionally, the second arm is secured to the second side surface by glue.

Optionally, the second arm is secured to the second side surface by a screw.

Optionally, the display apparatus further comprises a second elastic pad on a side of the display panel distal to the elastic pad.

Optionally, the display apparatus further comprises a printed circuit board.

Optionally, the display apparatus further comprises a bezel.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now describe more specifically with reference to the following embodiments. It is to be noted that the following descriptions of some embodiments are presented herein for purpose of illustration and description only. It is not intended to be exhaustive or to be limited to the precise form disclosed.

The present disclosure identifies several problems associated with conventional liquid crystal display device. One of the problems is that conventional liquid crystal display device has a large thickness. In addition, conventional liquid crystal display device typically has a complex backlight assembly structure and liquid crystal display module structure, requiring a number of components and involving a multi-step assembling process.

In one aspect, the present disclosure provides a superior backlight assembly, a superior display apparatus and display device having the same. The backlight assembly, the display apparatus and the display device requires fewer components and involves a much simpler assembling process. The design of the present backlight assembly, display apparatus and display device results in a much simpler structure and much smaller thickness. Thus, the present backlight assembly, display apparatus and display device are particularly suitable for large size display devices and have a much lower manufacturing costs.

In some embodiments, the present disclosure provides a backlight assembly including a backlight, an optical film, and a mold frame for retaining the light source and the optical film. The mold frame includes a side wall, a first end surface and a second end surface opposite to the first end surface, and a first side surface and a second side surface opposite to the first side surface. Optionally, the backlight and/or the optical film is enclosed by the mold frame so that the first end surface and the second end surface are the top and bottom surfaces of the mold frame in plan view of the optical film, the first side surface is the inner surface of the mold frame in plan view of the optical film, and the second side surface is the outer surface of the mold frame in plan view of the optical film.

The mold frame further includes a first receiving protrusion for receiving the backlight and a second receiving protrusion for receiving the optical film. The first receiving protrusion and the second receiving protrusion protrudes from the first side surface of the side wall in a first direction. Optionally, the first direction is substantially parallel to the first end surface and the second end surface. Optionally, the first receiving protrusion is proximal to the first end surface.

Optionally, the second receiving protrusion is proximal to the second end surface. In some embodiments, a peripheral portion of the optical film is on a side of the second receiving protrusion distal to the first receiving protrusion. In some embodiments, a peripheral portion of the backlight is on or connected to the first receiving protrusion. Optionally, the backlight includes a light source and a backplane, an end of the backplane adjoining an end of the first receiving protrusion, and the back plane and the first receiving protrusion substantially on a same plane. Optionally, the backlight includes a light source and a light guide, a peripheral portion of the light guide on a side of the first receiving protrusion proximal to the second receiving protrusion.

In some embodiments, the mold frame further includes a combining protrusion on the first end surface. Optionally, the combining protrusion extends in a second direction substantially perpendicular to the first end surface. Optionally, the combining protrusion has a substantially wedge shape.

In another aspect, the present disclosure provides a display apparatus having a backlight assembly described herein, further including a first elastic pad on a side of the first end surface distal to the second end surface, and a display panel on a side of the first elastic pad distal to the first end surface. In some embodiments, the optical film is on a side of the first elastic pad proximal to the first end surface, the optical film and the display panel are substantially parallel to each other. In some embodiments, the first elastic pad comprises a combining recess, the combining recess being fitted with the combining protrusion in the backlight assembly. Optionally, a peripheral portion of the optical film is sandwiched by the first elastic pad and the second receiving protrusion.

In some embodiments, the display apparatus further includes a baffle on a side of the first end surface distal to the second end surface, protruding in a third direction substantially parallel to the first end surface. Optionally, a peripheral portion of the optical film is sandwiched by the baffle and the second receiving protrusion. Optionally, the first elastic pad is thicker than the baffle.

In some embodiments, the display apparatus further includes a second elastic pad on a side of the display panel distal to the first elastic pad. Optionally, a peripheral portion of the display panel is sandwiched by the first elastic pad and the second elastic pad.

In some embodiments, the display apparatus further includes a bezel enclosing other components of the display apparatus including, but are not limited to, the display panel, the backlight assembly, the first elastic pad and/or the second elastic pad, the baffle, and/or the printed circuit board.

Figure 1:
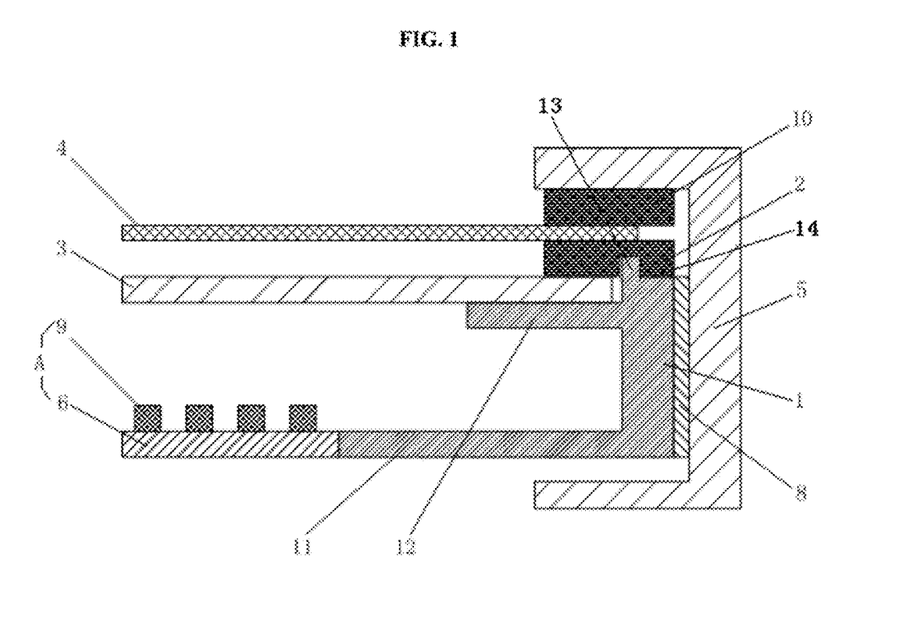
FIG. 1 is a diagram illustrating the structure of a display apparatus in some embodiments.
Figure 2:
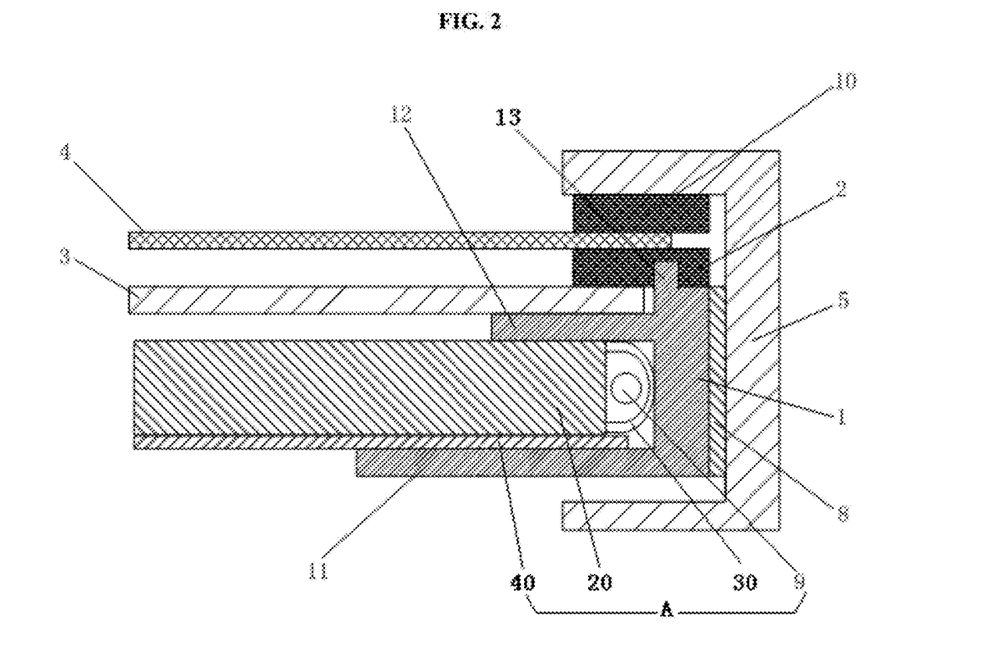
FIG. 2 is a diagram illustrating the structure of a display apparatus in some embodiments.
Figure 3:
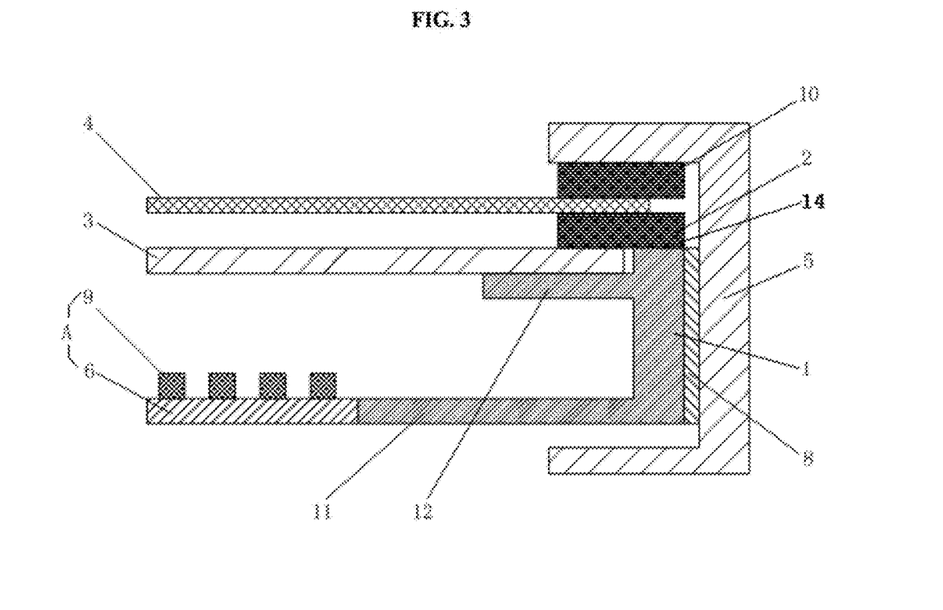
FIG. 3 is a diagram illustrating the structure of a display apparatus in some embodiments.

FIGS. 1-3 are diagrams illustrating the structures of some display apparatuses in some embodiments. Referring to FIG. 1 or FIG. 2, the display apparatuses in the embodiments include a backlight assembly, an elastic pad 2, and a display panel 4. The backlight assembly in the embodiments include a backlight A, an optical film 3, and a mold frame 1 for retaining the backlight A and the optical film 3. The mold frame 1 includes a side wall (e.g., the vertical portion of the mold frame 1 in FIG. 1 or 2), a first end surface 14 (e.g., the top surface of the mold frame 1 in FIG. 1 or 2) and a second end surface (e.g., the bottom surface of the mold frame 1 in FIG. 1 or 2) opposite to the first end surface 14, a first side surface (e.g., the left side surface of the mold frame 1 in FIG. 1 or 2) and a second side surface (e.g., the right side surface of the mold frame 1 in FIG. 1 or 2) opposite to the first side surface. The mold frame 1 further includes a first receiving protrusion 11 for receiving the backlight A and a second receiving protrusion 12 for receiving the optical film 3. The first receiving protrusion 11 and the second receiving protrusion 12 protrude from the first side surface of the side wall in a first direction (e.g., the left direction in FIG. 1 or 2) substantially parallel to the first end surface 14 and the second end surface. As shown in the FIGS. 1 and 2, the first receiving protrusion 11 is proximal to the first end surface 14 and the second receiving protrusion is proximal to the second end surface (e.g., in the middle of the side wall).

In some embodiments, the backlight A is secured to the first receiving protrusion 11. In some embodiments, the first elastic pad 2 is on a side of the first end surface 14 distal to the second end surface. Optionally, the first elastic pad 2 is secured to the first end surface 14.

In some embodiments, a peripheral portion of the optical film 3 is on a side of the second receiving protrusion 12 distal to the first receiving protrusion 11. Optionally, the peripheral portion of the optical film 3 is between the second receiving protrusion 12 and the first elastic pad 2. Optionally, the peripheral portion of the optical film 3 is sandwiched by the second receiving protrusion 12 and the first elastic pad 2.

In some embodiments, the display panel 4 on a side of the first elastic pad 2 distal to the first end surface 14. Optionally, the optical film and the display panel are substantially parallel to each other.

By having the first elastic pad 2 on a side of the first end surface 14 distal to the second end surface (e.g., optionally securing the first elastic pad 2 to the first end surface 14) and having the optical film 3 on a side of the second receiving protrusion 12 distal to the first receiving protrusion 11 (e.g., optionally having the optical film 3 between the second receiving protrusion 12 and the first elastic pad 2), the thickness of the backlight assembly and the display apparatus can be minimized, resulting in a thinner display device.

Referring to FIGS. 1-3, the mold frame 1 in the embodiments includes a first receiving protrusion 11 for receiving the backlight A and a second receiving protrusion 12. In the examples as shown in FIGS. 1-3, the first receiving protrusion 11 is at the end of the mold frame 1 (e.g., coterminous with the second end surface), and the second receiving protrusion 12 is in the middle of the mold frame 1 (e.g., proximal to but not coterminous with the first end surface 14).

In the examples as shown in FIGS. 1-2, the backlight A is secured to the first receiving protrusion 11. The light emitted from the backlight A is modulated by the optical film 3 and then projected onto the display panel 4. In the examples, the first elastic pad 2 is secured to the first end surface 14, the optical film 3 is between the second receiving protrusion 12 and the first elastic pad 2. For example, the optical film 3 is secured relative to the mold frame 1. In display panel 4 in the embodiments is secured to a side of the first elastic pad 2 distal to the first end surface 14. When the display panel 4 is assembled into a display apparatus or a display device, the display panel 4 is secured to the first elastic pad 2. In some embodiments, the display apparatus further includes a second elastic pad 10 on a side of the display panel 4 distal to the first elastic pad 2 (as shown in FIGS. 1-3). Optionally, the display panel 4 is secured to both the first elastic pad 2 and the second elastic pad 10. Optionally, the display panel 4 is secured to the second elastic pad 10 but not to the first elastic pad 2. Optionally, the display panel 4 is secured to the first elastic pad 2 but not to the second elastic pad 10. For example, the first elastic pad 2 can be secured to the display panel 4 whereas the second elastic pad 10 is secured to the bezel 5. In the display apparatus assembly, the bezel 5 presses against the display panel 4 through the second elastic pad 10.

The display panel is costly and is prone to damage. Typically, the mold frame 1 is made of a relatively inelastic material. Without an elastic pad, the impact of the mold frame 1 against the display panel 4 upon external force on the display panel 4 often results in damages to the display panel. By having a first elastic pad 2 and/or a second elastic pad 10, the impact can be absorbed by the elastic pads, and the display panel 4 can be better protected.

Figure 4:
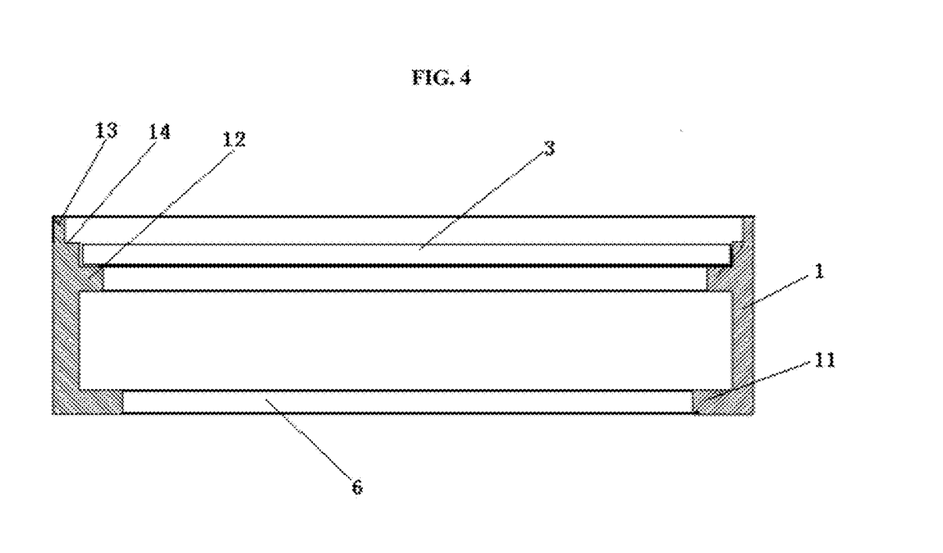
FIG. 4 is a diagram illustrating an assembled structure including a frame, a backplane, and an optical film in some embodiments.

Referring to FIGS. 1-2, the first elastic pad 2 in the embodiments is secured to the mold frame 1 by having a combining recess in the first elastic pad 2 paired with a combining protrusion 13 in the mold frame 1. As shown in the examples, the mold frame 1 includes a combining protrusion 13 on the first end surface 14, and the first elastic pad 2 includes a combining recess corresponding to the combining protrusion 13, the combining recess being fitted with the combining protrusion 13. In FIGS. 1-2, the combining protrusion 13 extends in a second direction substantially perpendicular to the first end surface 14. The combining protrusion 13 may be on any appropriate position on the first end surface 14. For example, the combining protrusion 13 may be on an edge of the first end surface 14 proximal to the first side surface (FIG. 1), or on an edge of the first end surface 14 proximal to the second side surface (FIG. 4), or in the middle of the first end surface 14. The combining recess in the first elastic pad 2 may be on a position corresponding to the combining protrusion 13. Optionally, the combining protrusion 13 has a substantially wedge shape. Optionally, the first elastic pad 2 is secured to the mold frame 1 without a combining recess/protrusion mechanism. By securing the first elastic pad 2 to the frame 1, e.g., by having the combining protrusion 13 and the combining recess, the contact surface between the first elastic pad 2 and the frame 1 can be increased, and the movement of the first elastic pad 2 restricted. Light leakage caused by movement of the first elastic pad 2 can be prevented.

Upon an external force, the impact against the display panel 4 and/or the mold frame 1 deforms the first elastic pad 2. To ensure that the display panel 4 is not damaged by the impact caused by the external force, the deformation of the first elastic pad 2 has to sufficiently absorb the impact between the display panel 4 and the mold frame 1. For example, the first elastic pad 2 has to be thick enough around the region corresponding to the combining recess to produce sufficient deformation capable of absorbing the impact. Accordingly, once the overall thickness of the first elastic pad 2 is determined, the thickness of the combining protrusion 13 may be determined based on the magnitude of impact between the display panel 4 and the mold frame 1. The larger the impact, the smaller the thickness of the first elastic pad 2 should be. The thickness of the first elastic pad 2 can be determined to have a value such that the movement of the first elastic pad 2 is restricted and deformation produced by the thickness is sufficient to absorb an impact having the expected magnitude. For example, an elastic pad thickness of 3 millimeter around the region corresponding to the combining recess is needed to sufficiently absorb an impact no more than 10 Newtons, an elastic pad thickness of 1 millimeter around the region corresponding to the combining recess is needed to sufficiently absorb an impact no more than 20 Newtons, In some embodiments, the backlight A has a bottom lighting structure (FIG. 1). Optionally, the backlight A includes a light source 9 and a backplane 6. Optionally, an end of the backplane 6 adjoins an end of the first receiving protrusion 11. Optionally, the backplane 6 and the first receiving protrusion 11 are substantially on a same plane. The light source 9 is secured on a side of the backplane 6 proximal to the second receiving protrusion 12. Optionally, the backlight A further includes a reflector on the backplane 6 for reflecting the light emitted by the light source 9 towards the optical film 3.

In some embodiments, the backlight A has an edge lighting structure (FIG. 2). Optionally, the backlight A includes a light source 9 and a light guide 20. Optionally, a peripheral portion of the light guide 20 is on a side of the first receiving protrusion 11 proximal to the second receiving protrusion 12. Optionally, the backlight A further includes a light source cover 30 and a reflector plane 40. Optionally, the light source 9 and the light source cover 30 are secured to the first side surface of the mold frame 1 between the first receiving protrusion 11 and the second receiving protrusion 12. Optionally, the reflector plane 40 is secured to the first receiving protrusion 11, the light guide 20 is secured to the reflector 40 on a side of the reflector 40 distal to the first receiving protrusion 11. The light emitted by the light source 9 is transmitted to the optical film 3 through the light source cover 30, the light guide 20, and the reflector plane 40, and then projected onto the display panel 4.

Figure 5:
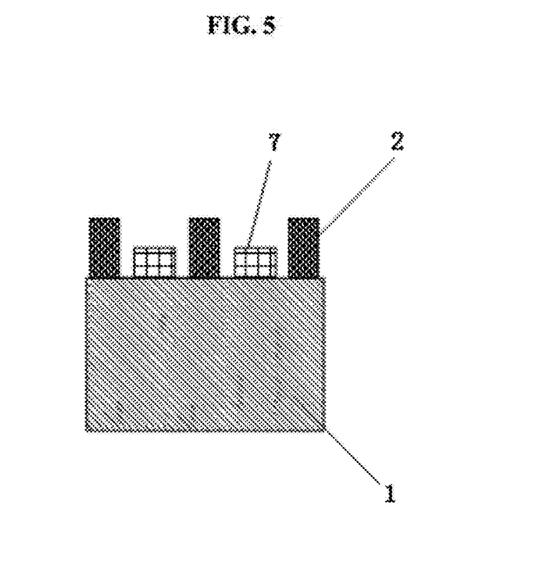
FIG. 5 is a diagram illustrating an assembled structure including a frame, a baffle, and an elastic pad in some embodiments.
Figure 6:
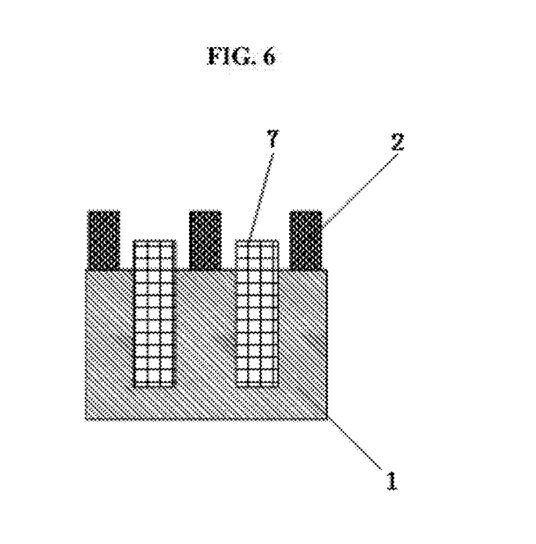
FIG. 6 is a diagram illustrating an assembled structure including a frame, a baffle, and an elastic pad in some embodiments.

Referring to FIGS. 5-6, the display apparatuses in the embodiments further include a baffle 7. The baffle 7 is on a side of the first end surface 14 distal to the second end surface, protruding in a third direction substantially parallel to the first end surface 14. For example, in some display apparatuses, a peripheral portion of the optical film 3 is sandwiched by the baffle 7 and the second receiving protrusion 12. Optionally, the first elastic pad 2 is thicker than the baffle 7.

By securing the baffle 7 to the mold frame 1, and by having the optical film 3 sandwiched by the baffle 7 and the second receiving protrusion 12, the optical film 3 can be securely placed within the display apparatus. By having the first elastic pad 2 thicker than the baffle 7, a stable display apparatus structure can be achieved without increasing the thickness.

Upon an external force, the impact against the display panel 4 and/or the mold frame 1 deforms the first elastic pad 2. To ensure that the display panel 4 is not damaged by the impact caused by the external force, the deformation of the first elastic pad 2 has to sufficiently absorb the impact between the display panel 4 and the mold frame 1. For example, the first elastic pad 2 has to be thicker than the baffle 7 to a certain degree adequate for producing sufficient deformation capable of absorbing the impact. Accordingly, once the overall thickness of the first elastic pad 2 is determined, the thickness of the baffle 7 may be determined based on the magnitude of impact between the display panel 4 and the mold frame 1. The larger the impact, the smaller the thickness of the baffle 7 should be. The thickness of the baffle 7 can be determined to have a value such that deformation produced by the thickness of the first elastic pad 2 is sufficient to absorb an impact having the expected magnitude. For example, a baffle thickness of 2 millimeter is needed to sufficiently absorb an impact no more than 50 Newtons, a baffle thickness of 5 millimeter is needed to sufficiently absorb an impact no more than 20 Newtons. Provided that components of the display apparatus can be secured within the display apparatus, a smaller thickness of the baffle 7 may be used to achieve a thinner display apparatus.

As discussed above, in some embodiments, the baffle 7 protrudes in a third direction substantially parallel to the first end surface 14, sandwiching a peripheral portion of the optical film 3 between the baffle 7 and the second receiving protrusion 12. The protruding length of the baffle 7 along the third direction can be, e.g., a length adequately securing the optical film 3 between the baffle 7 and the second receiving protrusion 12. Optionally, the protruding length is around 3 mm, the width of the first elastic pad 2 can be larger than, substantially equals to, or slightly smaller than the width of the first end surface 14. Optionally, the width of the first elastic pad 2 substantially equals to the width of the first end surface 14. Optionally, the display apparatus does not include a baffle 7, and the width of the first elastic pad 2 is larger than the width of the first end surface 14.

Figure 7:
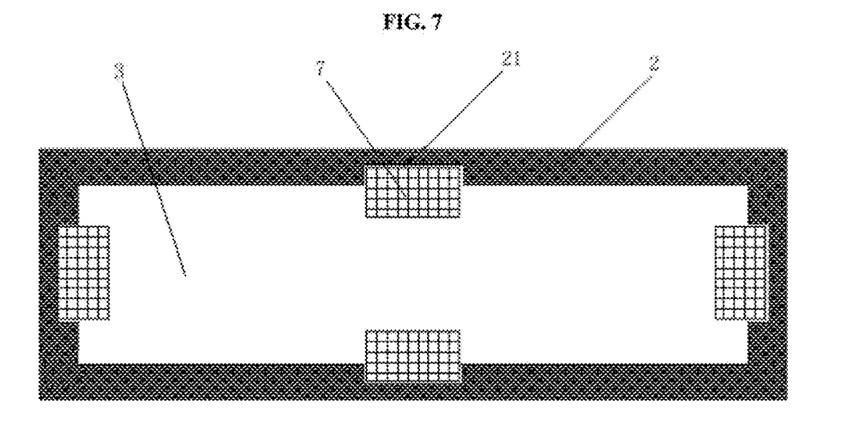
FIG. 7 is a diagram illustrating an assembled structure including an optical film, a baffle, and an elastic pad in some embodiments.

FIG. 7 is a diagram illustrating an assembled structure including an optical film, a baffle, and an elastic pad in some embodiments. Referring to FIG. 7, the first elastic pad 2 in the embodiment is a first elastic frame 2 having a substantially rectangular shape. The first elastic frame 2 includes a plurality of recesses 21 for receiving a plurality of the baffles 7, the plurality of recesses 21 being fitted with the plurality of the baffles 7.

In some embodiments, the baffle 7 is a plate-type baffle. One end of the plate baffle 7 is secured to the first end surface 14 within the recess 21 area, the other end of the plate baffle 7 secures the optical film 3 between the baffle 7 and the second receiving protrusion 12. By using a first elastic frame 2 having an integrated body, the assembly process can be much simplified. The embodiment as shown in FIG. 7 thus provides a simple yet stable structure for securing the optical film 3.

Figure 8:
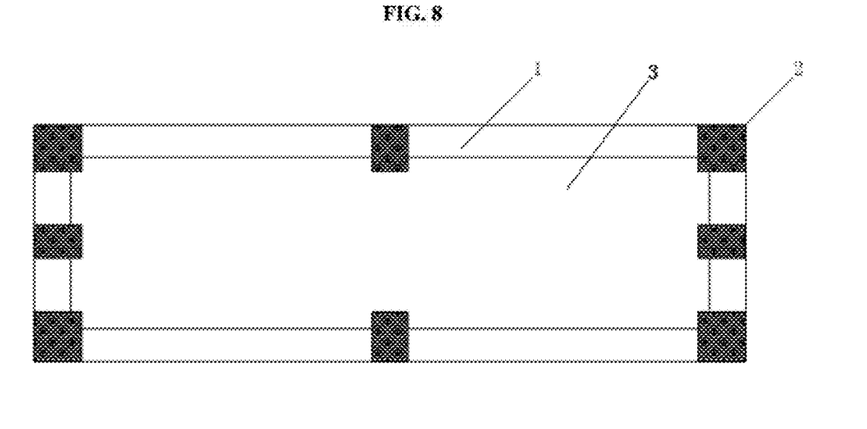
FIG. 8 is a diagram illustrating an assembled structure including an optical film and an elastic pad in some embodiments.
Figure 9:
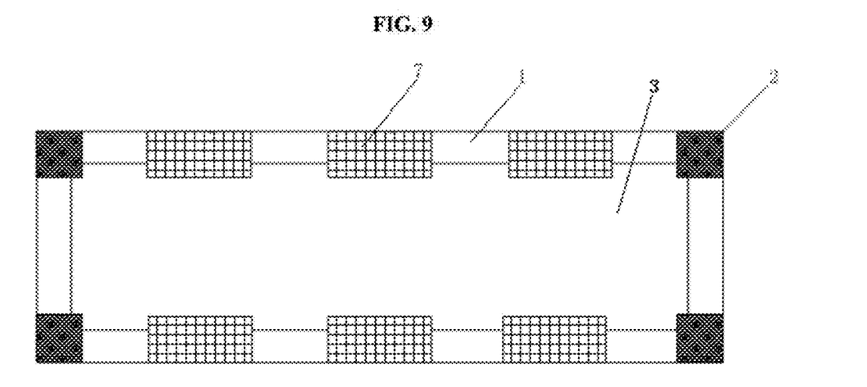
FIG. 9 is a diagram illustrating an assembled structure including an optical film, a baffle, and an elastic pad in some embodiments.

FIG. 8 is a diagram illustrating an assembled structure including an optical film and an elastic pad in some embodiments. Referring to FIG. 8 (or FIGS. 6, 9-12), the display apparatus in the embodiments include a plurality of the first elastic pads 2 secured to the first end surface 14, and the baffle 7 is between two neighboring first elastic pads 2.

In some embodiments, the first elastic pad 2 is a plate-type elastic pad. The display apparatus includes a plurality of first elastic pads 2 distributed (e.g., evenly distributed) on the first end surface 14. The display apparatus also includes a plurality of baffle 7, secured to the first end surface 14 between two neighboring first elastic pads 2. By using a plurality of first elastic pads 2 having an adequate thickness, the total weight of the display apparatus may be further minimized.

Figure 10:
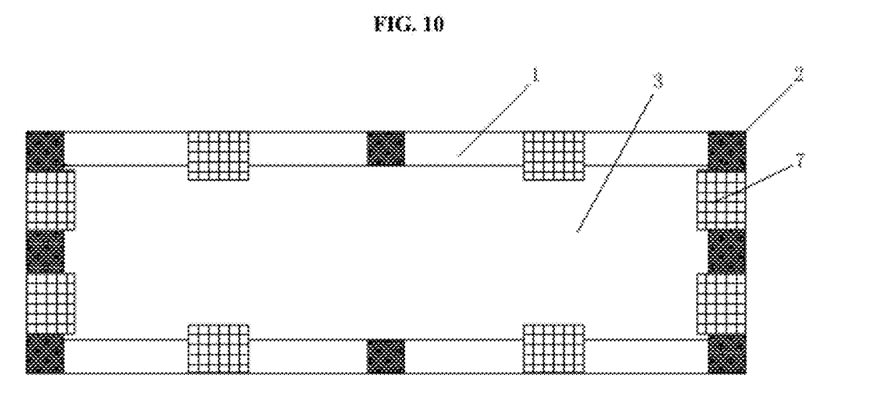
FIG. 10 is a diagram illustrating an assembled structure including an optical film, a baffle, and an elastic pad in some embodiments.

FIG. 10 is a diagram illustrating an assembled structure including an optical film, a baffle, and an elastic pad in some embodiments. Referring to FIG. 10, the display apparatus includes four first elastic pads 2 around four corners of the mold frame 1, secured to the first end surface 14.

Referring to FIG. 10 (or FIGS. 5-6), the display apparatus in the embodiment includes a plurality of first elastic pads 2 and a plurality of baffles 7, the baffle 7 and the first elastic pad 2 are alternately arranged and spaced apart on the first end surface 14. In some embodiments, the baffle 7 and the first elastic pad 2 are not alternately arranged. Optionally, the display apparatus may have two or more neighboring first elastic pads 2 without a baffle 7 interposed between neighboring first elastic pads 2. Optionally, the display apparatus may have two or more neighboring baffles 7 without a first elastic pad 2 interposed between neighboring baffles 7. Various alternative embodiments of arranging the baffle 7 and the first elastic pads 2 may be practiced to make a display apparatus having a stable structure and adequately protecting the display panel 4 from external damages.

Referring to FIG. 10, the display apparatus in the embodiment includes eight first elastic pads 2. The eight first elastic pads 2 are on four corners and four middle portions of the mold frame 1. The number and positions of the first elastic pads 2 can be such that they don't interfere with other components of the display apparatus. Optionally, the display apparatus includes a larger number of first elastic pads 2 on the first end surface 14 along a longer side of the mold frame 1 as compared to that on the first end surface 14 along a shorter side of the mold frame 1. Optionally, the plurality of first elastic pads 2 have a substantially same size. Optionally, the plurality of first elastic pads may have different sizes. Optionally, the baffles 7 and/or the first elastic pads 2 are spaced apart. Optionally, the baffles 7 and/or the first elastic pads 2 are adjacent to each other.

The first elastic pad 2 may have any appropriate cross-section shape. Optionally, the cross-section of the first elastic pad 2 may have a shape selected from the group consisting of a polygon, a circle, an ellipse. Optionally, the first elastic pad 2 has a rectangular shape.

Figure 11:
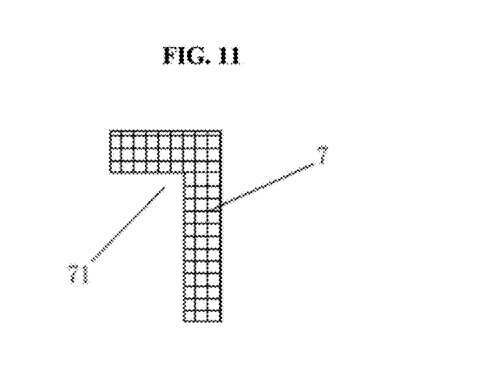
FIG. 11 is a diagram illustrating a baffle in some embodiments.

FIG. 11 is a diagram illustrating a baffle in some embodiments. Referring to FIG. 11, the baffle 7 in the embodiment has a substantially L shape having a first arm and a second arm. The first arm on a side of the first end surface 14 distal to the second end surface. The second arm on a side of the second side surface distal to the first side surface 14. By having a L-shape baffle 71, the contact area between the baffle 7 and the mold frame 1 can be increased. Optionally, the baffle 7 is glued to the side surfaces of the mold frame 1. Optionally, the second arm is secured to the second side surface by glue. Optionally, the second arm is secured to the second side surface by a screw.

Figure 12:
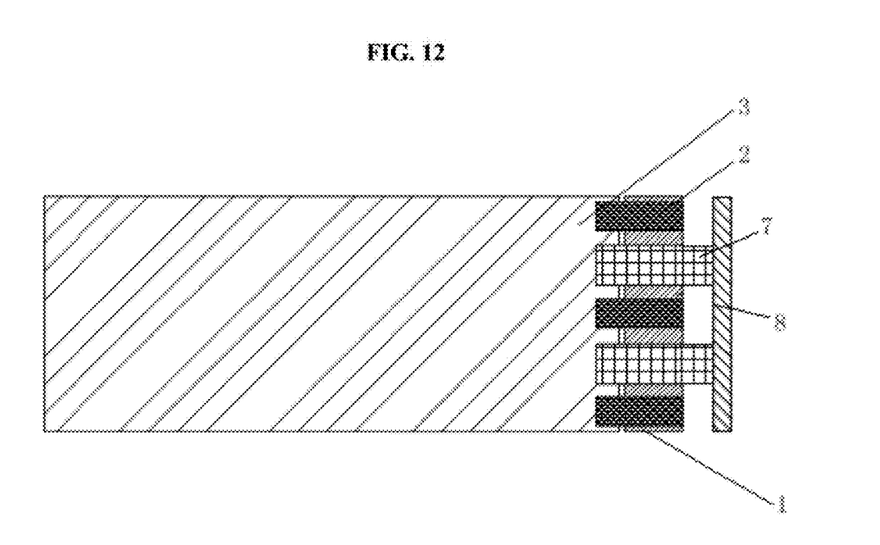
FIG. 12 a diagram illustrating an assembled structure including a frame, a baffle, an elastic pad, and a printed circuit board in some embodiments.

FIG. 12 a diagram illustrating an assembled structure including a frame, a baffle, an elastic pad, and a printed circuit board in some embodiments. Referring to FIG. 12, the baffle 7 is a plate-type baffle 7. Optionally, the printed circuit board 8 (e.g., a flexible printed circuit board 8) may be secured to a side surface (e.g., the second side surface) of the mold frame 1. Optionally, the baffle 7 is secured to the side surfaces of mold frame 1 by a screw. Optionally, the second arm is secured to the second side surface by a screw. By having this design, the thickness and weight of the display apparatus may be minimized.

By having the first elastic pad 2 on a side of the first end surface 14 distal to the second end surface (e.g., optionally securing the first elastic pad 2 to the first end surface 14) and having the optical film 3 on a side of the second receiving protrusion 12 distal to the first receiving protrusion 11 (e.g., optionally having the optical film 3 between the second receiving protrusion 12 and the first elastic pad 2), the thickness of the backlight assembly and the display apparatus can be minimized, resulting in a thinner display device.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display apparatus, comprising a backlight assembly;
   wherein the backlight assembly comprises a backlight; an optical film; and a frame for retaining the backlight and the optical film;
   wherein the frame comprises a side wall having a first end surface, a second end surface opposite to the first end surface, a first side surface and a second side surface opposite to the first side surface; a first receiving protrusion for receiving the backlight; and a second receiving protrusion for receiving the optical film, the first receiving protrusion and the second receiving protrusion protruding from the first side surface of the side wall in a first direction;
   the display apparatus further comprises:
   an elastic pad on a side of the first end surface distal to the second end surface; and
   a display panel on a side of the elastic pad distal to the first end surface;
   wherein a peripheral portion of the optical film is between the second receiving protrusion and the elastic pad, a projection of the second receiving protrusion on a plane containing a surface of the optical film in plan view of the optical film at least partially overlaps with a projection of the peripheral portion of the optical film on the plane containing the surface of the optical film in plan view of the optical film, and a projection of the elastic pad on the plane containing the surface of the optical film in plan view of the optical film at least partially overlaps with the projection of the peripheral portion of the optical film on the plane containing the surface of the optical film in plan view of the optical film; and
   the frame comprises a combining protrusion on the first end surface, the elastic pad comprises a combining recess, the combining recess in the elastic pad and the combining protrusion in the frame cooperatively configured to secure the elastic pad to the frame.

2. The display apparatus of claim 1, wherein the peripheral portion of the optical film is in contact with the second receiving protrusion and the elastic pad.

3. The display apparatus of claim 1, wherein a peripheral portion of the optical film is on a side of the second receiving protrusion distal to the first receiving protrusion.

4. The display apparatus of claim 1, wherein the backlight comprises a light source and a backplane, an end of the backplane adjoining an end of the first receiving protrusion, a back plane and the first receiving protrusion substantially on a same plane.

5. The display apparatus of claim 1, wherein the backlight comprises a light source and a light guide, a peripheral portion of the light guide on a side of the first receiving protrusion proximal to the second receiving protrusion.

6. The display apparatus of claim 1, wherein the frame comprises a combining protrusion on the first end surface.

7. The display apparatus of claim 6, wherein the combining protrusion extending in a second direction substantially perpendicular to the first end surface.

8. The display apparatus of claim 6, wherein the combining protrusion has a substantially wedge shape.

9. The display apparatus of claim 1, wherein the first direction is substantially parallel to the first end surface and the second end surface.

10. The display apparatus of claim 1, wherein the elastic pad is an elastic frame having a substantially rectangular shape.

11. The display apparatus of claim 1, wherein the display apparatus comprises a plurality of the elastic pads.

12. The display apparatus of claim 11, wherein the display apparatus comprises four elastic pads around four corners of the frame.

13. The display apparatus of claim 11, wherein the display apparatus comprises eight elastic pads.

14. The display apparatus of claim 1, further comprising a baffle on a side of the first end surface distal to the second end surface, protruding in a third direction substantially parallel to the first end surface, a peripheral portion of the optical film is sandwiched by the baffle and the second receiving protrusion.

15. The display apparatus of claim 14, wherein the elastic pad is thicker than the baffle.

16. The display apparatus of claim 14, wherein the elastic pad is an elastic frame having a substantially rectangular shape, the elastic frame comprises a plurality of recesses for receiving a plurality of the baffles, the plurality of recesses being fitted with the plurality of the baffles.

17. The display apparatus of claim 14, wherein the display apparatus comprises a plurality of the elastic pads, the baffle is between two neighboring elastic pads.

18. The display apparatus of claim 14, wherein the baffle has a substantially L shape comprising a first arm and a second arm, the first arm on a side of the first end surface distal to the second end surface, the second arm on a side of the second side surface distal to the first side surface.

19. The display apparatus of claim 1, further comprising a second elastic pad on a side of the display panel distal to the elastic pad.

\* \* \* \* \*